United States Patent
Wilson

(10) Patent No.: US 8,065,350 B2
(45) Date of Patent: *Nov. 22, 2011

(54) METHOD AND SYSTEM FOR FLEXIBLY PROVIDING SHARED ACCESS TO DATA POOLS

(75) Inventor: Christopher S. Wilson, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/338,917

(22) Filed: Jan. 25, 2006

(65) Prior Publication Data

US 2006/0173843 A1 Aug. 3, 2006

Related U.S. Application Data

(60) Provisional application No. 60/648,647, filed on Jan. 31, 2005.

(51) Int. Cl.
*G06F 12/00* (2006.01)

(52) U.S. Cl. ........ 707/822; 711/100; 711/147; 707/823; 707/828

(58) Field of Classification Search .................. 711/100, 711/147; 707/822, 823, 828
See application file for complete search history.

(56) References Cited

U.S. PATENT DOCUMENTS

| | | | |
|---|---|---|---|
| 5,367,682 A | 11/1994 | Chang | |
| 5,535,376 A * | 7/1996 | Catherwood et al. | 713/502 |
| 5,539,879 A | 7/1996 | Pearce et al. | |
| 5,680,540 A | 10/1997 | Pearce | |
| 6,173,376 B1 | 1/2001 | Fowler et al. | |
| 6,438,639 B1 | 8/2002 | Bakke et al. | |
| 6,578,034 B1 | 6/2003 | Rafanello | |
| 6,615,365 B1 | 9/2003 | Jenevein et al. | |
| 6,675,176 B1 | 1/2004 | Shinkai et al. | |
| 6,675,242 B2 | 1/2004 | Benson et al. | |
| 6,963,951 B2 | 11/2005 | Ng et al. | |
| 6,976,060 B2 * | 12/2005 | Manczak et al. | 709/219 |
| 7,155,466 B2 * | 12/2006 | Rodriguez et al. | 707/205 |
| 7,299,314 B2 | 11/2007 | Lin et al. | |
| 2002/0059539 A1 | 5/2002 | Anderson | |
| 2002/0124108 A1 * | 9/2002 | Terrell et al. | 709/245 |
| 2003/0018657 A1 * | 1/2003 | Monday | 707/204 |
| 2003/0023811 A1 | 1/2003 | Kim et al. | |
| 2004/0255048 A1 * | 12/2004 | Lev Ran et al. | 709/249 |
| 2005/0081004 A1 | 4/2005 | Zhang | |
| 2006/0031524 A1 * | 2/2006 | Freimuth et al. | 709/227 |

* cited by examiner

*Primary Examiner* — Jasmine Song

(74) *Attorney, Agent, or Firm* — McAndrews, Held & Malloy, Ltd.

(57) ABSTRACT

Herein described is a method and system for providing shared access to data residing within a data pool of a data storage device. Aspects of the invention incorporate the use of one or more mechanisms by which access to the data occurs. The one or more mechanisms may be enabled or disabled by way of one or more selections that are made using a user interface. In a representative embodiment, the user interface may comprise a web browser. The method may involve assigning one or more values to one or more variables and subsequently executing a software program. The software program invokes one or more share access mechanisms when the one or more values are equal to one or more enabling values. The system may comprise a memory that is used to store the software program and a processor that is used to execute the software program.

45 Claims, 3 Drawing Sheets

| | NFS | CIFS | FTP | HTTP |
|---|---|---|---|---|
| Share #1 | X | ☐ | ☐ | X |
| Share #2 | ☐ | ☐ | ☐ | ☐ |
| Share #3 | ☐ | X | ☐ | ☐ |
| Share #4 | ☐ | ☐ | X | ☐ |

[ APPLY ]   [ CANCEL ]

|  | NFS | CIFS | FTP | HTTP |
|---|---|---|---|---|
| Share #1 | X |  |  | X |
| Share #2 |  |  |  |  |
| Share #3 |  | X |  |  |
| Share #4 |  |  | X |  |

[APPLY]  [CANCEL]

Figure 3

METHOD AND SYSTEM FOR FLEXIBLY PROVIDING SHARED ACCESS TO DATA POOLS

CROSS-REFERENCE TO RELATED APPLICATIONS/INCORPORATION BY REFERENCE

This application makes reference to and claims priority from U.S. Provisional Patent Application Ser. No. 60/648,647, entitled "METHOD AND SYSTEM FOR FLEXIBLY PROVIDING SHARED ACCESS TO DATA POOLS" filed on Jan. 31, 2005, the complete subject matter of which is incorporated herein by reference in its entirety.

This application makes reference to U.S. application Ser. No. 11/087,136 filed Mar. 22, 2005, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One or more users may wish to access data stored within a data storage device. The data storage device may comprise a number of data storage drives, such as hard disk drives. In certain occasions the data may be accessed and shared by the one or more users. The data may be shared using one or more shared directories, for example. Often, an administrator of the data storage device may wish to easily configure access to the shared data by the one or more users. For example, the administrator may wish to easily and efficiently suspend or resume user access to the shared data. Unfortunately, administering or configuring such user access to one or more shares may be an arduous process for the administrator.

The limitations and disadvantages of conventional and traditional approaches will become apparent to one of skill in the art, through comparison of such systems with some aspects of the present invention as set forth in the remainder of the present application with reference to the drawings.

SUMMARY OF THE INVENTION

Aspects of the invention provide a system and method for providing shared access to stored data in a data storage device. The data storage device may use one or more data pool file systems. The various aspects of the invention are substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 3 is a display of an administrative interface by which a user may configure one or more mechanisms that may be used to access one or more shares, in accordance with an embodiment of the invention.

DETAILED DESCRIPTION OF THE INVENTION

Figure 1:
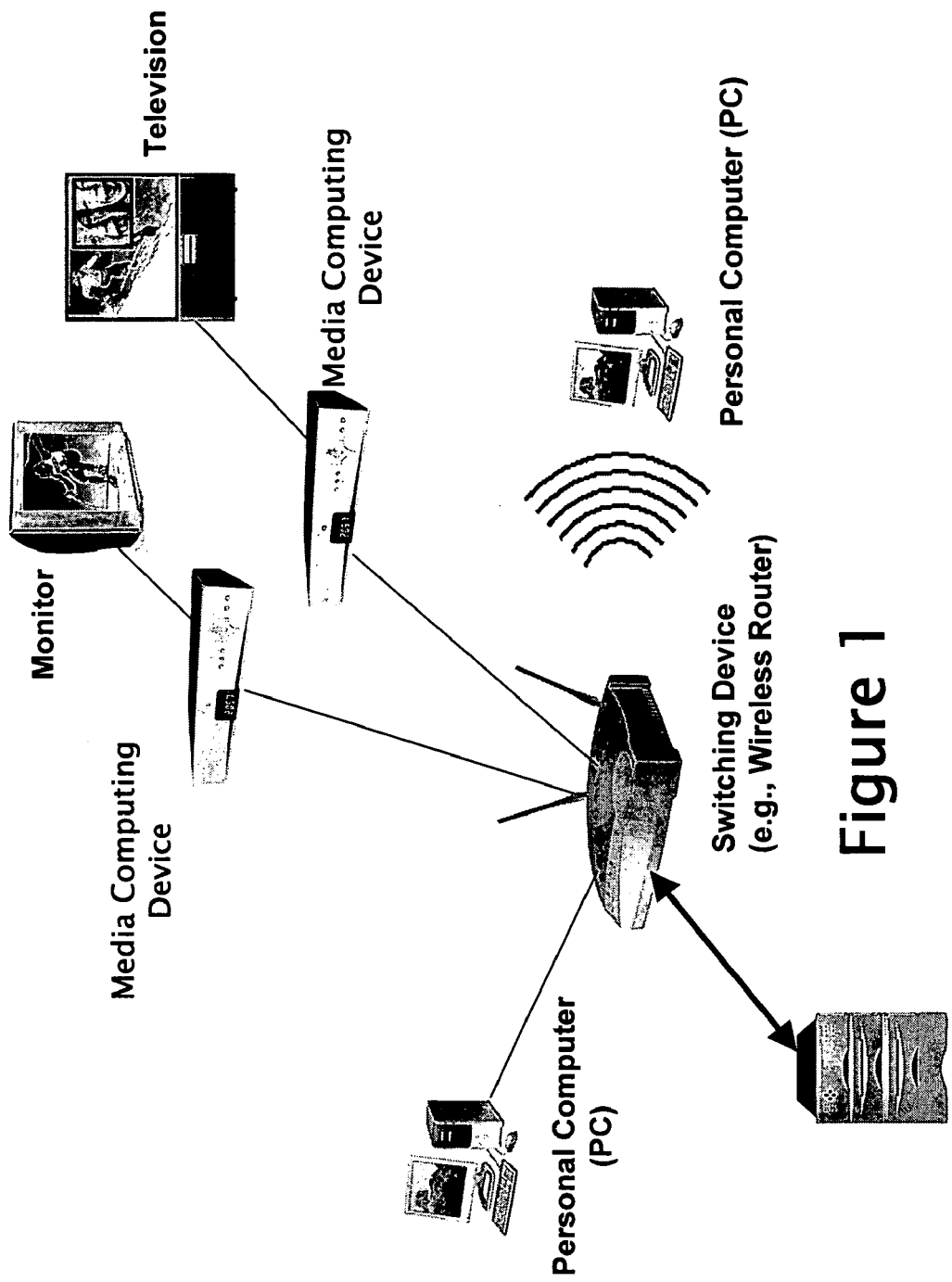
FIG. 1 illustrates a block diagram of a typical system incorporating the use of a data storage device, for providing shared access to data stored in the data storage device, using one or more mechanisms, in accordance with an embodiment of the invention.

Various aspects of the invention provide a system and method of flexibly providing shared access to data stored in a data storage device. The data storage device may utilize one or more file systems that implement one or more data pools. The one or more data pools may be used to implement one or more shares or shared directories. The data may be stored using the one or more shares or shared directories. One or more data computing or data processing devices may store data into the data storage device. The data storage device and the one or more data computing devices may be communicatively coupled by way of a data communications network. Aspects of the invention provide user access to one or more shares using one or more mechanisms. The one or more mechanisms may be used to provide secure access to a share to one or more users. The one or more users may be authorized, by way of secure authentication or verification, using a graphical user interface provided by the one or more data computing devices, for example. The graphical user interface may be provided by way of an application such as a web browser, for example. The one or more mechanisms may be implemented by running or executing software resident in a memory of a data storage device, for example. The one or more mechanisms may comprise enabling or disabling access by way of using one or more communication protocols. Use of the one or more mechanisms allows an administrator to easily control access to one or more shares. The one or more shares may be used to store or retrieve one or more data files. Each share of the one or more shares may allocate a portion of one or more data pools. Details on data pools and shares may be referenced in U.S. application Ser. No. 11/087,136 filed Mar. 22, 2005, which is incorporated herein by reference in its entirety.

Because it may be networked and accessed using a data communications network, the data storage device may comprise what is referred to as a network attached storage device (NAS). The data storage device may comprise one or more data storage drives, such as hard disk drives, or any other type of drive. The data storage device may comprise a combination of different types of data storage drives. A data storage drive may comprise any type of media capable of storing data. Hereinafter, the term "hard disk drive" alternatively may refer to a data storage drive or any drive or component comprising a media used to store data. In a representative embodiment, one or more data storage drives or hard disk drives may be incorporated into a data storage device. In a representative embodiment, the data storage device facilitates the incorporation of the one or more additional data storage drives or hard disk drives.

Further aspects of the invention provide a system and method that facilitates the automated pooling, mirroring, and striping of data storage capacity provided by one or more hard disk drives. In addition, aspects of the invention permit the use of drives of different sizes and speeds when implementing RAID functions.

One or more data pools may be created using one or more portions of one or more hard disk drives. Each of the data pools may be considered a logical drive. Any unallocated space that resides over the one or more hard drives may be re-partitioned and then subsequently concatenated in order to generate a data pool. Portions of multiple hard disk drives may be used to create the data pool. For example, a portion of a first hard disk drive and a portion of a second hard disk drive may be used to form a data pool. In a representative embodiment, one or more hard disk drives are grouped together to provide increased data storage capacity and/or to provide data mirroring/data striping. In a representative embodiment, the grouped or linked hard disk drives are physically contained within a single data storage device. The data storage device may be networked in a local area network, for example, to provide a storage facility for any number of data processing or computing devices. The data processing or computing devices may comprise one or more computers, for example.

FIG. 1 illustrates a block diagram of a typical system incorporating the use of a data storage device 100, for providing shared access to data stored in the data storage device 100, using one or more mechanisms, in accordance with an embodiment of the invention. The data storage device 100 provides data storage for accessing one or more data files, used by one or more data computing (or data processing) devices. As illustrated, an exemplary switching device provides connectivity of the data storage device 100 to the one or more data computing devices. The switching device, such as a wireless router, may be capable of providing connectivity when performing data archiving, by way of using wireless or wireline communications. For example, the switching device may utilize any one of the following wireless or wireline data communications protocols: 10/100 Ethernet, gigabit Ethernet, 802.11x, Bluetooth, and the like. As illustrated, the one or more data computing devices may comprise one or more personal computers (PCs), media computing devices, or any other like device, for example. The media computing devices, as illustrated, are connected to a television or a monitor capable of playing multimedia content. Use of the data storage device 100 may provide a centralized storage device for storing and retrieving data used by the one or more data computing devices. The data may be resident in one or more shares of one or more data pools. The one or more mechanisms that provide secure access to the data may comprise running or executing a software that flexibly allows a user, such as an administrator, to easily suspend or resume access to a share or shared directory. The software may be hereinafter referred to as an access control software (ACS). The ACS may be stored in a memory of the data storage device. The ACS may be stored in one or more data storage drives of the data storage device. The memory may comprise a non-volatile memory, such as a flash memory, for example. The ACS may be loaded when the data storage device is booted up, for example. A processor resident within a data storage device may be used to execute one or more sets of instructions of the ACS when the data storage device is booted up, for example.

Figure 2:
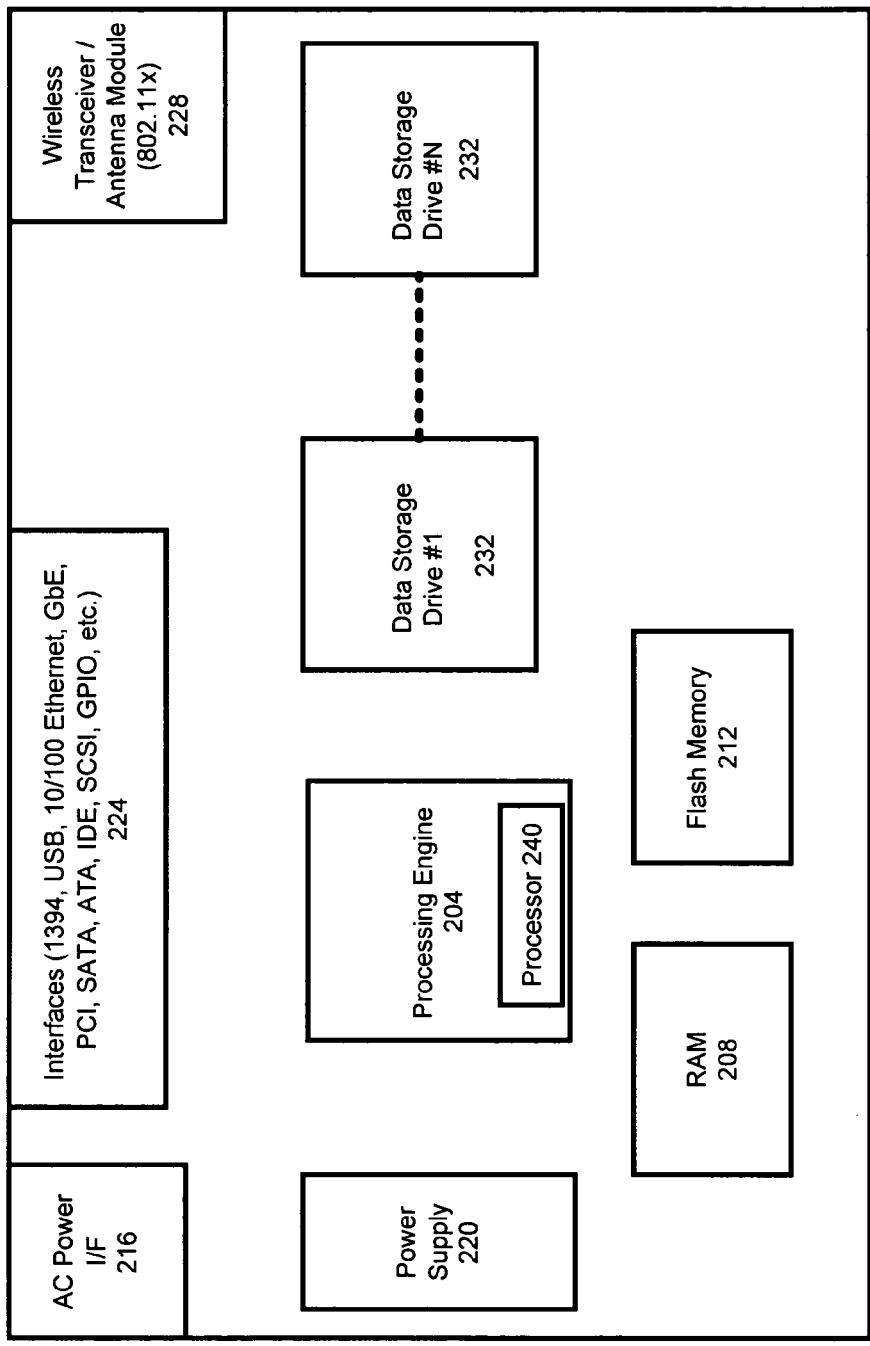
FIG. 2 is a block diagram of a data storage device that employs one or more mechanisms to control access to data stored in the data storage device, in accordance with an embodiment of the invention.

FIG. 2 is a block diagram of a data storage device 200 that employs one or more mechanisms to control access to data stored in the data storage device 200, in accordance with an embodiment of the invention. One or more mechanisms may comprise one or more data communications protocols. As illustrated the data storage device may comprise a processing engine 204 that utilizes a processor 240, a random access memory 208, a flash memory 212, an AC power interface 216, a power supply 220, one or more interfaces 224, a wireless transceiver/antenna module 228, and one or more data storage drives (such as one or more hard disk drives) 232. The one or more interfaces 224 may comprise the following interfaces: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the data storage device 200. The AC power interface 216 and power supply 220 may be used for providing power to the data storage device 200. The one or more data storage drives 232 may comprise any number of hard drives depending on the data storage requirements of the one or more data computing devices in the network. The random access memory 208 and flash memory 212 may be used for storing the ACS. The processor 240 may be used for executing the ACS that is resident in the flash memory 212, for example. The execution may be controlled and monitored by way of a data computing device, such as a personal computer (PC) that is communicatively coupled to the data storage device 200. The ACS may be downloaded into the flash memory 212 by way of control provided by, for example, the PC or another data computing device. In a representative embodiment, the processor 240 is implemented within the processing engine 204. The processing engine 204 may perform one or more other digital signal processing functions. When the software is executed, one or more of the following protocols may be utilized: NFS (i.e., Network File System), CIFS (i.e., Common Internet File System), FTP (i.e., File Transfer Protocol), and HTTP (i.e., Hypertext Transfer Protocol). Each of the one or more protocols provides a mechanism by which a share may be accessed. Various aspects of the invention allow suspending and resuming access to a share. Each of the one or more mechanisms used may operate independently of each other.

In a representative embodiment, share access is controlled or configured by way of an administrative interface. The administrative interface may be implemented on any graphical user interface (GUI). The administrative interface may employ the use of a browser such as Microsoft Windows Internet Explorer or Netscape, for example. Share access by way of using a particular protocol may be enabled or disabled using the administrative interface.

FIG. 3 is a display of an administrative interface by which a user may configure one or more mechanisms that may be used to access one or more shares, in accordance with an embodiment of the invention. In a representative embodiment, the administrative interface may comprise a web page that allows the user to input selections associated with a desired access configuration. The graphical user interface may resemble a table containing a number of selectable checkboxes. The user, such as an administrator, may check off a checkbox to select a particular share access mechanism. The table may comprise a number of rows and columns. Each row may represent a share (or share name or identifier) while each column may represent an access mechanism or method. When, for example, NFS, CIFS, FTP, and HTTP are used as the access mechanisms, the table may have four columns that are labeled NFS, CIFS, FTP, and HTTP. The checkboxes may be used by a user to indicate whether one or more members of a share are allowed access using a particular mechanism (i.e., NFS, CIFS, FTP, and HTTP). The user or administrator, may check off one or more checkboxes, using a point and click device, such as a mouse, for example, in order to provide share access using the one or more mechanisms. After all selections are made, a user may click or press the "apply" button to enable the selections. Should a user make an error during the selection process, he may click or press the "cancel" button, to clear all his selections. As illustrated in FIG. 3, a user has selected four checkboxes such that access to Share #1 is performed using NFS and HTTP, while access to Share #3 is performed using CIFS, while access to Share #4 is performed using FTP, for example. In the representative embodiment of FIG. 3, none of the four mechanisms or protocols (NFS, CIFS, FTP, HTTP) is used to provide access to Share #2. However, NFS and HTTP are used as mechanisms to provide access to Share #1, CIFS is as a mechanism to provide access to share #3, while FTP is used as a mechanism to provide access to Share #4. When a user makes one or more selections by using the administrative user interface, he may effectively suspend or resume user access to the one or more shares.

When the apply button (as shown in FIG. 3) is clicked, a Javascript application executed using the browser or web page may perform one or more HTTP "post" operations that transmits one or more values associated with the selections to the NAS. The NAS may function as a web server, for example, to serve the Javascript application to the user's data computing device. The values transmitted may be incorporated into a NAS database as one or more name-value pairs. In a representative embodiment, the NAS may verify a newly supplied name-value pair to an existing name-value pair. The newly supplied name-value pair may replace the existing name-value pair that is stored in a database. The database may be referred to as a "share specific variable database". Each share may be associated with a corresponding specific variable database. By making one or more selections over the administrative user interface, one or more protocols (i.e., NFS, CIFS, FTP, HTTP) may be used as mechanisms for accessing data.

Since the share specific variable database is share specific, it acts as a mechanism for associating data to a particular share or share directory. Conceptually, this mechanism associates name-value pairs with one or more shares, where the name corresponds to the name of a variable and the value is the value for that variable. For any given share and a variable name in which this share is associated with, there may be at most one value associated with the variable name. In a representative embodiment, both the variable name and the value must be zero-terminated ASCII strings. Arbitrarily many name-value pairs may be associated with any given share.

One or more shares that are created within a data pool may be referred to as one or more "native shares". A data pool may be generated by a NAS by way of allocating space from one or more data storage drives (such as hard disk drives) to form a storage block that is used by a Reiser file system, for example. In a representative embodiment, one Reiser file system per pool. The Reiser file system for a data pool may provide a directory for each share within a data pool. Optionally, each share may contain a file that comprises the share specific variable database for that share. The file containing the share specific variable database may be named share_XXX_vars.txt, in which, XXX corresponds to its associated share name. For example, if a particular data pool had shares named share_Share1, share_Share2, and share_Share3, the Reiser file system for this data pool may have corresponding share specific variable database files named Share1_vars.txt, Share2_vars.txt, and Share3_vars.txt, respectively. If a share did not contain a corresponding share_XXX_vars.txt file, the share would be considered to be a share without share variables. The share specific variable database for each share is located within a file external to its share. (For example, the share specific variable database may be located within a data pool outside of the share.) As a result, in this representative embodiment, the associated file (i.e., share_XXX_vars.txt) is not accessible to a user even if the user has full access rights to the share. The user may perform arbitrary file operations within a share without affecting its share specific variable database. The various aspects of the invention allow for portability or transferability of the share access configuration provided by the share specific variable database, when a data storage drive containing the share specific variable database, is moved from one NAS to another NAS.

In a representative embodiment, the contents of a share_XXX_vars.txt file comprises a number of lines of text. For example, share_Share1_vars.txt may comprise a textual file having the following lines:
    aaa=v1
    bbb=v2
    ccc=v3

Each line of the share_Share1_vars.txt file is of the form <name>=<value>. The share specific variables for share_Share1_vars.txt are named aaa, bbb, and ccc, for example. The associated value for aaa is v1, while the associated value for bbb is v2, and the associated value for ccc is v3. The values may be interpreted using C language string literal backslash escape sequences \\ and \xxx where xxx represents three octal digits. The octal digits may allow use of arbitrary values within the value field for each of the share specific variables.

A share specific variable may be used to specify whether a particular share access control mechanism is enabled or disabled. For example, when CIFS is used as the protocol, a variable termed cifs_enable may be used as the share specific variable for determining if CIFS will provide access to a share (e.g., cifs_enable=v4). Likewise, nfs_enable may be used as the share specific variable for determining whether NFS is used to provide access to a particular share (e.g., nfs_enable=v5). Each of these exemplary variables may be set to a value. The value controls (i.e., enables or disables) access to its associated share. The value may comprise a high or low value (e.g., cifs_enable=1 or cifs_enable=0), for example. The value assigned to a particular share specific or default control variable may determine whether access is provided using its associated share access mechanism. Each of the one or more protocols (i.e., CIFS, NFS, or the like) may provide a share access control mechanism for one or more shares. On the other hand, if either of these variables is set to a value that disables share access, the members or users for that share may not access any data associated with that protocol. In addition to the one or more variables that may be used to enable a particular share access control mechanism, execution of the NAS software may employ the use of one or more default control variables. If, for example, cifs_enable is not defined for a particular share, then its corresponding default control variable, cifs_enable_default, may be used to determine whether or not the share is accessible by way of a mechanism that uses the CIFS protocol.

In the event that the NAS receives a new value for a share specific variable, the NAS may set the share specific variable to the new value. It may perform this by way of an HTTP "post" operation using a web server or web browser, for example. If necessary, the NAS executes software or code associated with a particular share access control mechanism to either enable or disable access to its associated share. It is contemplated that this is performed differently based on the type of protocol used. For NFS, for example, a utility referred to as "exportfs" may be used to update one or more tables in a running kernel. The tables in the running kernel are verified when a request is received using NFS. For CIFS, for example, a Samba configuration file may be rebuilt and Samba may be sent a SIGHUP Linux signal. The SIGHUP Linux signal prompts Samba to reread its configuration file. Thereafter, an smbcontrol program, in Samba, may be used with a "close-share" program to send a message to one or more running Samba processes. This process may facilitate closing any open accesses to a share when the share is being suspended.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method comprising:
   generating a corresponding value for a share specific variable associated with each of one or more selections to create a name-value pair;
   storing said name-value pair into a file; and
   executing a software that selectively enables access to one or more shared directories using one or more selected share access mechanisms, said share access mechanism selected based on said name-value pair stored in said file, said file stored within a data pool external to one or more shared directories.

2. The method of claim 1 wherein said file comprises a text file.

3. The method of claim 1 wherein said one or more selections is used to control said one or more share access mechanisms.

4. The method of claim 1 wherein one of said one or more share access mechanisms comprises NFS.

5. The method of claim 1 wherein one of said one or more share access mechanisms comprises CIFS.

6. The method of claim 1 wherein one of said one or more share access mechanisms comprises FTP.

7. The method of claim 1 wherein said one of said one or more share access mechanisms comprises HTTP.

8. The method of claim 1 wherein a user interface is generated using a web browser, said user interface used for receiving one or more inputs for said generating said corresponding value.

9. The method of claim 8 wherein said web browser comprises Internet Explorer.

10. A method of flexibly providing access to shared data in one or more data pools comprising:
    assigning one or more values to one or more share specific variables, said one or more values used for enabling one or more share access mechanisms by which one or more members associated with a shared directory may access said shared directory;
    storing a name-value pair into a file; and
    executing a software program, wherein said executing determines whether said one or more share access mechanisms are functional based on whether said one or more values are equal to one or more enabling values.

11. The method of claim 10 wherein said one or more share access mechanisms comprises NFS.

12. The method of claim 10 wherein said one or more share access mechanisms comprises CIFS.

13. The method of claim 10 wherein said one or more share access mechanisms comprises FTP.

14. The method of claim 10 wherein said one or more share access mechanisms comprises HTTP.

15. The method of claim 10 wherein said assigning is performed by selecting said one or more share access mechanisms by using a user interface.

16. The method of claim 15 wherein said user interface comprises a web browser.

17. A system for providing shared access to data residing within a data pool comprising:
    a memory;
    a software resident in said memory; and
    a processor used for executing said software, said executing providing one or more access mechanisms by which one or more members associated with a shared directory may access a data pool associated with said shared directory, said access mechanisms uniquely specified based on selections made through a graphical user interface, wherein a value of a share specific variable is used to enable at least one access mechanism of said one or more access mechanisms.

18. The system of claim 17 wherein said memory comprises a flash memory.

19. The system of claim 17 wherein said one or more access mechanisms comprises NFS.

20. The system of claim 17 wherein said one or more access mechanisms comprises CIFS.

21. The system of claim 17 wherein said one or more access mechanisms comprises FTP.

22. The system of claim 17 wherein said one or more access mechanisms comprises HTTP.

23. A method comprising:
    receiving one or more selections that specify one or more share access protocols used for accessing data stored in one or more shared directories of a data pool, said selection made by way of a graphical user interface;
    generating a database based on said one or more selections;
    storing said database external to said shared directories; and
    executing a software using said database to selectively enable said one or more share access protocols, said one or more shared directories accessible only to one or more members having share access rights to each of said one or more shared directories, wherein a value of a share specific variable is used to enable access to at least one shared directory of said one or more shared directories by way of using a share access protocol of said one or more share access protocols.

24. The method of claim 23 wherein said one or more share access protocols uses NFS.

25. The method of claim 23 wherein said one or more share access protocols uses CIFS.

26. The method of claim 23 wherein said one or more share access protocols uses FTP.

27. The method of claim 23 wherein said one or more share access protocols uses HTTP.

28. The method of claim 23 wherein said shared directories are managed by a Reiser file system.

29. A data storage device comprising:
    a memory for storing a software;
    a plurality of data storage drives for storing one or more files that specifies whether one or more share access protocols are used for accessing one or more shared directories located within one or more first data pools in a Reiser file system, said one or more files configured based on share access protocol selections received using a graphical user interface generated from a device that is communicatively coupled to said data storage device; and a processor for executing said software using said one or more files to selectively provide shared access to said one or more shared directories, said one or more files stored in one or more second data pools external to said one or more shared directories.

30. The data storage device of claim 29 wherein said data storage drives comprises hard disk drives.

31. The data storage device of claim 29 wherein said memory comprises a non-volatile random access memory (NVRAM).

32. The data storage device of claim 29 wherein said memory comprises a flash memory.

33. The data storage device of claim 29 wherein said one or more share access protocols uses NFS.

34. The data storage device of claim 29 wherein said one or more share access protocols uses CIFS.

35. The data storage device of claim 29 wherein said one or more share access protocols uses FTP.

36. The data storage device of claim 29 wherein said one or more share access protocols uses HTTP.

37. The data storage device of claim 29 wherein said shared directories are managed by a Reiser file system.

38. A data storage device comprising:
a plurality of data storage drives for storing a software and for storing one or more files; and a processor for executing said software using one or more files to selectively provide shared access to said one or more shared directories, said one or more files used for specifying whether one or more share access mechanisms are used for accessing said one or more shared directories in a Reiser file system, said one or more files configured based on one or more selections received using a graphical user interface.

39. The data storage device of claim 38 wherein said data storage drives comprises hard disk drives.

40. The data storage device of claim 38 wherein said one or more share access mechanisms uses NFS.

41. The data storage device of claim 38 wherein said one or more share access mechanisms uses CIFS.

42. The data storage device of claim 38 wherein said one or more share access mechanisms uses FTP.

43. The data storage device of claim 38 wherein said one or more share access mechanisms uses HTTP.

44. The data storage device of claim 38 wherein said shared directories are managed by a Reiser file system.

45. The data storage device of claim 38 wherein a share access configuration determined by said one or more files may be transferred to another data storage device by way of transferring one or more data storage drives containing said file to said another data storage device.

* * * * *